United States Patent [19]

Hehl

[11] 4,418,844
[45] Dec. 6, 1983

[54] MOVABLE GRANULATE HOPPER FOR INJECTION MOLDING MACHINE

[76] Inventor: Karl Hehl, Arthur-Hehl-Strasse 32, 7298 Lossburg 1, Fed. Rep. of Germany

[21] Appl. No.: 329,067

[22] Filed: Dec. 9, 1981

[30] Foreign Application Priority Data

Dec. 9, 1980 [DE] Fed. Rep. of Germany ....... 3046348

[51] Int. Cl.³ ............................................. B29F 1/00
[52] U.S. Cl. .................................... 222/162; 222/325; 222/383; 425/582
[58] Field of Search ...................... 406/91; 138/44, 92, 138/94; 285/181, 184, 155; 222/160, 162, 164, 317, 173, 174, 325, 413, 383; 425/580, 582

[56] References Cited

U.S. PATENT DOCUMENTS

| | | | |
|---|---|---|---|
| 1,390,976 | 9/1921 | Banbury | 222/410 |
| 2,686,618 | 8/1954 | Mateer | 222/413 X |
| 4,067,353 | 1/1978 | De Hoff | 138/92 X |
| 4,144,012 | 3/1979 | Pinkley | 425/580 X |
| 4,251,204 | 2/1981 | Hehl | 425/582 |
| 4,266,694 | 5/1981 | Hehl | 222/167 |

FOREIGN PATENT DOCUMENTS 2847980 5/1980 Fed. Rep. of Germany ...... 425/582

*Primary Examiner*—David A. Scherbel
*Attorney, Agent, or Firm*—Joseph A. Geiger

[57] ABSTRACT

A structure supporting a hopper with granulate raw material on the injection unit of an injection molding machine, the structure featuring a conical lower section on the hopper with an adjoining hopper extension in the form of a cylindrical wall and a radial flange, the hopper extension being clamped between a hopper base and a clamping bell with a conical cavity. On the carrier bridge of the injection unit is mounted a horizontal guide plate which engages a guide groove in a flange of the hopper base, for transverse mobility of the hopper between the charge chute of the plastification cylinder and a discharge opening. A clamping lever serves to secure the hopper on the guide plate.

8 Claims, 3 Drawing Figures

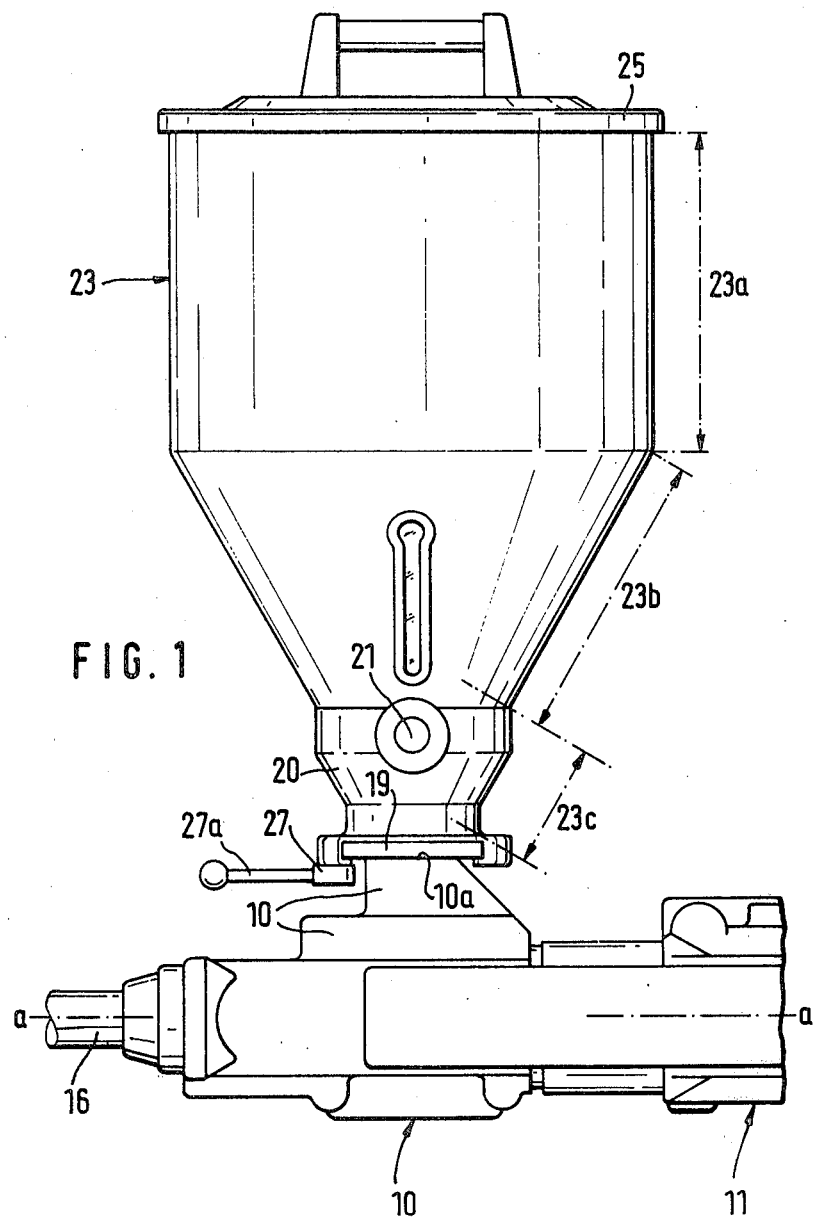

MOVABLE GRANULATE HOPPER FOR
INJECTION MOLDING MACHINE

BACKGROUND OF THE INVENTION

1. Field of the Invention

The present invention relates to injection molding machines and, more particularly, to a supporting structure for a granulate hopper on the injection unit of an injection molding machine which offers the possibility of shifting the granulate hopper laterally away from the charge chute of the injection unit.

2. Description of the Prior Art

A typical injection unit has two parallel guide rods supporting a carrier bridge with a central plastification cylinder and cooperating plastification screw. The carrier bridge also supports a raw material hopper containing the granular plastic raw material for the injection molding machine.

The hopper typically has a conical bottom portion from which the granulate is fed downwardly into the plastification cylinder through a charge chute. Such a hopper supporting structure is disclosed in German Auslegesschrift (Publ. Allowed Application) No. 28 47 980 and in German Offenlegungsschrift (Publ. Application) No. 29 20 584. Major portions of both applications are also contained in U.S. Pat. No. 4,251,204. These publications suggest granulate hoppers of small to medium capacity.

Typically, the hopper is made of steel sheet, having a conical lower hopper section, to the outlet extremity of which is attached an annular reinforcing collar. The latter has a generally triangular cross section defined by a cylindrical outer surface and a hopper-supporting conical inner surface. To the reinforcing collar is bolted a tubular connector which, in turn, is releasably clampable to a tubular extension of the carrier bridge of the injection unit. In situations, where the injection unit is so arranged that its charge chute is oriented horizontally, an intermediate connecting cylinder may be utilized, in which case the hopper is mounted vertically on the horizontal connecting cylinder. The above-mentioned Offenlegungsschrift also suggests a hopper mounting structure which includes a transversely oriented guide plate at the entrance to the charge chute of the injection unit and a cooperating dovetailing groove in the reinforcing collar of the granulate hopper. This configuration makes it possible to shift the hopper laterally away from the charge chute of the injection unit and into alignment with a discharge bore in the guide plate, so that the hopper can be emptied of its granulate contents.

These prior art hopper supporting structures have certain disadvantages, especially in connection with hoppers of large capacity, or in connection with hoppers which, for one or the other reason, may be oriented at an inclination or may have an asymmetrical outline. The requirement of having absolutely smooth continuous surfaces inside the conical lower hopper section puts certain limitations on the hopper supporting structure, especially on the connection between the outlet extremity of the hopper and the annular reinforcing ring. It has been found that an inclined or asymmetrical hopper may create fatigue failure in the prior art hopper mounting structure.

SUMMARY OF THE INVENTION

Underlying the present invention is the primary objective of devising an improved supporting structure for a granulate hopper which, while being strong enough to be used in connection with granulate hoppers of large capacity, is simple in structure and provides a lateral mobility for the hopper.

The present invention proposes to attain this objective by suggesting a hopper supporting structure which includes a lower hopper section in the form of a truncated sheet metal cone and a hopper extension at the lower end of this cone in the form of an outwardly recessed continuation of the hopper wall which is clampable between a cup-shaped hopper base engaging the conical hopper section and its extension from the outside and a clamping bell engaging the hopper extension from the inside. The clamping bell has a conical cavity which continues the interior surface of the lower hopper section into a bell mouth which is aligned with the charge chute of the injection unit.

In a preferred embodiment of the invention, the conical hopper section has a cone angle of 60 degrees, and the hopper extension consists of a short cylindrical wall portion and an adjoining radially inwardly extending flange at the lower extremity of the hopper extension. The hopper base and the clamping bell have matching cylindrical length portions and radial shoulders, positioning the hopper by engaging the cylindrical portion of the hopper extension and firmly clamping it in place by pressing against its radial end flange from below and above, respectively.

The invention further suggests a connection between the hopper base and the carrier bridge of the injection unit which involves the use of a transversely extending guide plate on the carrier bridge and a matching guide groove arranged in a flange portion of the hopper base. A clamping screw with an attached clamping lever provides a convenient means for manually securing the hopper in any desired position along the guide plate. A second opening in the guide plate, located at a lateral distance from the charge chute, serves as a hopper discharge opening. By shifting the granulate hopper from the charge chute to the discharge opening, it is possible to empty the hopper, without removing it from the injection unit. The discharge opening is preferably spaced such a distance from the charge chute that, when the hopper is placed half-way therebetween, its bottom opening is closed off by the guide plate.

BRIEF DESCRIPTION OF THE DRAWINGS

Further special features and advantages of the invention will become apparent from the description following below, when taken together with the accompanying drawings which illustrate, by way of example, an embodiment of the invention represented in the various figures as follows:

FIG. 1 shows, in an elevational view, portions of a horizontally oriented injection unit which carries a granulate hopper, using a supporting structure in accordance with the present invention;

DESCRIPTION OF THE PREFERRED EMBODIMENT

As can be seen in FIG. 1, the granulate hopper 23 has a cylindrical upper hopper section 23a and a conical lower hopper section 23b. Typically, these hopper sections are manufactured of steel sheet. The upper end of the hopper 23 is covered with a hopper lid 25.

Figure 2:
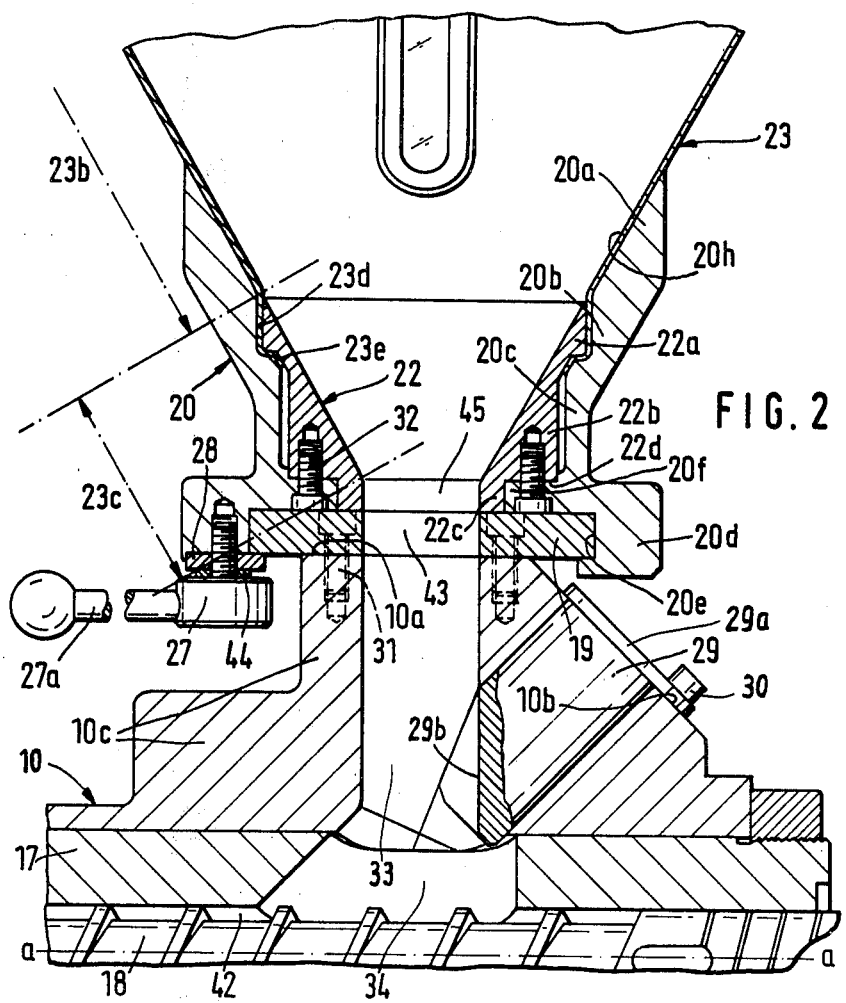
FIG. 2 shows the hopper supporting structure in an enlarged elevational cross section.

FIG. 2 shows how the conical lower section 23b of the hopper is supported by, and attached to a hopper base 20. For this purpose, the lower hopper section 23b, which is a truncated cone, is adjoined at its lower extremity by a short cylindrical hopper extension 23d. The latter terminates in a radially inwardly crimped flange 23e. The hopper extension 23d thus forms a recess from the conical outline of the lower hopper section 23b. This recess is occupied by a clamping bell 22 which has a conical cavity in geometric alignment with the conical shape of the lower hopper section 23b, the upper extremity of the clamping bell 22 forming a clamping collar 22a which matches the recess of the hopper extension 23d.

The hopper base 20 supports the hopper 23 by engaging a lower end portion of its conical section 23b with a matchingly conical supporting collar 20a, by also engaging the hopper extension 23d with a matching cylindrical bore, and by supporting the radial flange 23e of the hopper extension 23d on an interior shoulder 20b. The clamping bell 22, having an opposing annular shoulder 22d, pulls the lower hopper section 23b into the hopper base 20, when its clamping bolts 32 are tightened. These bolts engage threaded bores in the midsection 22b of the clamping bell. An interior rim 20f of the hopper base 20 accommodates the heads of the bolts 32, while centering the clamping bell 22 by engaging its centering collar 22c.

In order to concentrate the clamping pressure of the clamping bell 22 against the radial flange 23e of the hopper extension, the annular shoulder 22d and the end face of the centering collar 22c of the clamping bell 20 are preferably provided with a small vertical clearance to the hopper base 20 and the plate 19, respectively.

As can be seen in FIG. 2, the conical cavity of the clamping bell 22 forms a smooth continuation of the conical surface of the lower hopper section 23b, terminating in a short cylindrical bell mouth 45 of approximately equal vertical extent as the centering collar 22c. The granulate flows downwardly through the bell mouth 45 into a charge chute 33 of the injection unit, via a matching bore 43 in the guide plate 19. For the achievement of an optimal support connection between the hopper 23 and the hopper base 20, both the hopper base 20 and the clamping bell 22 are preferably machined parts. In order to reduce the weight of the hopper base 20, its midsection is reduced to a neck portion 20c.

The hopper 23 and its hopper base 20 are supported on a carrier bridge 10 of the injection unit, as can be seen in FIG. 1. The carrier bridge 10, in turn, is supported on, and guided by two parallel horizontal guide rods 16 which also carry a second carrier bridge 11. Centrally between the two horizontal guide rods is arranged a plastification cylinder 17 (FIG. 2) which is fixedly mounted in the carrier bridge 10 from which it extends forwardly in the direction of the injection molding die (not shown). The second carrier bridge 11 carries a hydraulic drive to which is coupled a plastification screw 18 which cooperates with the bore of the plastification cylinder 17 to plastify and inject the plastic raw material.

FIG. 2 shows that the carrier bridge 10 has on its upper side a mounting hub 10c which terminates in a horizontal mounting face 10a. The horizontal guide plate 19 is attached to the mounting face 10a by means of bolts 31. The bore 43 of the guide plate 19 and the downwardly adjoining charge chute 33 in the mounting hub 10c of the carrier bridge form a straight vertical continuation of the bell mouth 45 of the hopper assembly. The plastification cylinder 17 itself has an enlarged entry taper 34 which forms a plastification chamber.

On the rear side of the mounting hub 10c of carrier bridge 10 is arranged a second mounting face 10b which is inclined at an angle of 45 degrees and surrounds a correspondingly inclined bore 40 which may serve as an inclined charge chute in connection with an alternative configuration of the injection unit and the hopper supporting structure in which the axis of the injection unit is oriented vertically. This configuration is the subject of my companion application Ser. No. 329,068 filed Dec. 9, 1981.

The inclined bore 40 joins the vertical charge chute 33 just above the entry taper 34 of the plastification cylinder 17. A chute plug 29 occupies the cavity of the bore 40, the plug 29 being held in place by means of a screw 30 which clamps its end flange 29a to the inclined mounting face 10b. In the area of the intersection with the vertical charge chute 33, the chute plug 29 has an inclined gouge 29b which forms a smooth continuation of the wall of the charge chute 33 in the hub 10c.

Figure 3:
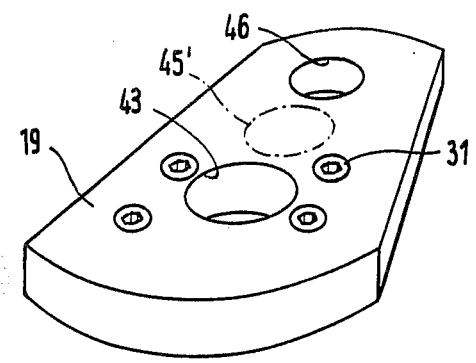
FIG. 3 shows the guide plate of the hopper supporting structure.

The guide plate 19 which carries the granulate hopper 23 is shown in FIG. 3. This plate is attached to the mounting face 10a in such a way that it extends horizontally to one side of the injection unit, so that a discharge opening 46 near the distal extremity of plate 19 is located beyond the carrier bridge 10. The hopper base 20 engages the guide plate 19 by means of a matching guide groove 20e which is arranged in a radially enlarged flange 20d of the hopper base 20. The guide groove 20e extends diametrically through the base flange 20d.

On the forward side of the hopper supporting structure is further arranged a clamping mechanism by means of which the granulate hopper 23 can be secured on the transverse guide plate 19. This clamping mechanism includes a threaded clamping screw 27 with an enlarged head to which is attached a horizontal clamping lever 27a. Under the head of the clamping screw 27 is arranged a pressure disc 28 which is arranged in a matching recess on the lower side of the base flange 20d. The pressure disc 28 bears with one edge portion against its recess and with the opposite edge portion against the underside of the guide plate 19. A suitable shim washer 44 determines the angular clamping position of the lever 27a.

The horizontal guide plate 19 and the clamping screw 27 offer the possibility of shifting the hopper assembly from its normal position in alignment with the plate bore 43 to a discharge position in alignment with the discharge bore 46. This makes it possible to empty the hopper of its contents, without removing it from the injection unit. In an intermediate position of the hopper 23, indicated by a stippled circle 45' in FIG. 3, the bell mouth 45 of the hopper assembly is closed off by the guide plate 19, thus permitting access to the plate bore 43 and the charge chute 33.

It should be understood, of course, that the foregoing disclosure describes only a preferred embodiment of the invention and that it is intended to cover all changes and modifications of this example of the invention which fall within the scope of the appended claims.

I claim the following:

1. A structure supporting a raw material hopper on the injection unit of an injection molding machine, for the gravity feed of granulate raw material from the hopper into the plastification cylinder of the injection unit, the hopper supporting structure comprising in combination:
a mounting hub on the injection unit having an upwardly facing mounting face and a charge chute in the form of a bore which extends from the mounting face into the plastification cylinder;
a lower section on the hopper in the form of a truncated sheet metal cone;
a hopper extension at the lower end of the cone forming an outwardly recessed continuation of the hopper wall;
a cup-shaped hopper base having on its upper end a supporting collar with a conical inner surface engaging a portion of the outer surface of the lower hopper section just above the hopper extension and, therebelow, a recessed inner surface portion engaging the hopper extension;
a clamping bell arranged inside the hopper base, the clamping bell having a central opening forming a conical downward continuation of the inner surface of the lower hopper section, the clamping bell including an annular clamping collar which fits against the outwardly recessed wall of the hopper extension;
means for constraining the clamping bell downwardly against the hopper base so as to clamp the hopper extension between the clamping collar of the clamping bell and the recessed inner surface of the hopper base; and
means for releasably securing the hopper base on the mounting hub of the injection unit.

2. A hopper supporting structure as defined in claim 1, wherein
the hopper extension has a cylindrical wall portion adjoining the lower extremity of the lower hopper section and a radially inwardly extending flange at the lower extremity of the hopper extension;
the hopper base has an interior shoulder supporting the radial flange of the hopper extension from below; and
the clamping bell has an exterior shoulder as part of its clamping collar engaging the radial flange of the hopper extension from above, thereby clamping it and the lowermost portion of the conical hopper section against the hopper base.

3. A hopper supporting structure as defined in claim 2, wherein
the supporting collar of the hopper base and the clamping collar of the clamping bell have cylindrical interior and exterior surfaces, respectively, with which they engage the cylindrical wall portion of the hopper extension from opposite sides.

4. A hopper supporting structure as defined in any one of claims 1 through 3, wherein
the clamping bell constraining means includes, as part of the clamping bell, a plurality of threaded bores which extend vertically upwardly into a midsection of the clamping bell and, as part of the hopper base, an interior rim which protrudes radially inwardly underneath the clamping bell midsection, as well as an equal plurality of threaded fastener which, by engaging said threaded bores and interior rim, create a vertical clamping action between the clamping bell and the hopper base.

5. A hopper supporting structure as defined in any one of claims 1 through 3, wherein
the mounting hub of the injection unit has attached to its mounting face a guide plate of substantially rectangular outline and horizontal orientation, the guide plate having a central bore which forms a continuation of the charge chute in the mounting hub;
the hopper base has near its lower extremity a base flange with an interior groove profile with which it engages opposite longitudinal edge portions of the guide plate for sliding engagement therewith; and
the hopper base securing means includes means for arresting the hopper base on the guide plate in at least its normal position in which the hopper is vertically aligned with the charge chute of the mounting hub.

6. A hopper supporting structure as defined in claim 5, wherein
the guide plate extends in a direction which is transverse to the axis of the plastification cylinder;
the guide plate has a discharge opening at a longitudinal distance from its central bore; and
the hopper is movable along the guide plate into alignment with the discharge opening, for discharge of the hopper contents.

7. A hopper supporting structure as defined in claim 6, wherein
the discharge opening of the guide plate is a bore of substantially the same diameter as its central bore; and
the distance between the discharge opening and the central bore is at least twice said diameter so that, when the hopper is moved to an intermediate position between the two bores, the guide plate prevents any discharge of raw material from the hopper.

8. A hopper supporting structure as defined in claim 5, wherein
the means for arresting the hopper base on the guide plate includes a clamping screw in a threaded bore of the hopper base, a clamping lever connected to the clamping screw, and a clamping element interposed between the clamping screw and the guide plate which, when the clamping lever is rotated, creates a frictional arresting action between the guide plate and the hopper base.

* * * * *